(12) United States Patent
Cook (10) Patent No.: US 11,512,492 B1
(45) Date of Patent: Nov. 29, 2022

(54) AWNING ASSEMBLY

(71) Applicant: Stephen R. Cook, Saint Clair Shores, MI (US)

(72) Inventor: Stephen R. Cook, Saint Clair Shores, MI (US)

( * ) Notice: Subject to any disclaimer, the term of this patent is extended or adjusted under 35 U.S.C. 154(b) by 0 days.

(21) Appl. No.: 17/520,344

(22) Filed: Nov. 5, 2021

(51) Int. Cl.
| | |
|---|---|
| *E04F 10/00* | (2006.01) |
| *E04H 15/08* | (2006.01) |
| *B60P 3/32* | (2006.01) |
| *B60J 1/20* | (2006.01) |
| *B60J 3/00* | (2006.01) |

(52) U.S. Cl.
CPC ............ *E04H 15/08* (2013.01); *B60J 1/2011* (2013.01); *B60J 3/005* (2013.01); *B60P 3/32* (2013.01); *E04F 10/00* (2013.01)

(58) Field of Classification Search
CPC .. B60P 3/32; E04H 15/08; E04F 10/00; E04F 10/005; E04F 10/02; E04F 10/04; B60J 3/002; B60J 3/005; B60J 1/2011
USPC ....................................................... 52/73–78
See application file for complete search history.

(56) References Cited

U.S. PATENT DOCUMENTS

| | | | | | |
|---|---|---|---|---|---|
| 346,267 | A | * | 7/1886 | Clayton ................... | B60J 3/005 160/131 |
| 615,174 | A | * | 11/1898 | Hettrick ................. | E04F 10/02 160/64 |
| 781,588 | A | * | 1/1905 | Branch et al. ........... | B60J 3/005 160/76 |
| 798,369 | A | * | 8/1905 | Stutenroth .............. | E04F 10/02 160/77 |
| 1,176,582 | A | * | 3/1916 | McKown ................. | B60J 3/002 160/48 |
| 1,255,300 | A | * | 2/1918 | Dyblie .................. | E04B 1/3445 52/70 |
| 1,304,766 | A | * | 5/1919 | Hamburger ............. | B60J 3/002 296/95.1 |
| 1,315,760 | A | * | 9/1919 | Chidley .................. | B60J 3/002 296/95.1 |
| 1,384,275 | A | * | 7/1921 | Pearce .................... | B60J 3/002 296/95.1 |
| 1,394,595 | A | * | 10/1921 | Winberg ................. | B60J 3/002 160/92 |
| 1,401,080 | A | * | 12/1921 | Hobelmann ............. | E06B 7/26 52/74 |
| 1,440,997 | A | * | 1/1923 | Judge ..................... | E04F 10/02 24/458 |
| 1,448,632 | A | * | 3/1923 | Luckel .................... | B60J 3/002 296/95.1 |
| 1,460,313 | A | * | 6/1923 | Watterson ............... | B60J 3/002 296/95.1 |
| 1,502,182 | A | * | 7/1924 | Forrest .................... | E04F 10/02 160/54 |
| 1,536,520 | A | * | 5/1925 | Parker .................... | E04F 10/02 160/58.1 |
| 1,546,688 | A | * | 7/1925 | Tanzola ................... | B60J 3/002 296/95.1 |
| 1,576,886 | A | * | 3/1926 | Williams ................. | B60J 3/005 160/88 |

(Continued)

*Primary Examiner* — Johnnie A. Shablack
(74) *Attorney, Agent, or Firm* — L.C. Begin & Assoc. PLLC (57) ABSTRACT

An awning assembly contains a frame and a frame cover attached to the frame. The frame is adapted to be removably fixed to an associated structure over a window or opening, such as on a recreational vehicle or camper, for example.

25 Claims, 8 Drawing Sheets

(56) References Cited

U.S. PATENT DOCUMENTS

| | | | | |
|---|---|---|---|---|
| 1,634,860 | A * | 7/1927 | Watson | B60J 3/005 160/48 |
| 1,644,662 | A * | 10/1927 | Anderson | B60J 3/002 296/95.1 |
| 1,662,261 | A * | 3/1928 | Dunn | B60J 3/005 296/152 |
| 2,126,213 | A * | 8/1938 | Schardt | E04F 10/02 160/352 |
| 2,154,394 | A * | 4/1939 | Clark | G09F 13/00 52/73 |
| 2,201,887 | A * | 5/1940 | De Bord | E04F 10/02 160/77 |
| 2,234,760 | A * | 3/1941 | Guarcello | E04F 10/08 52/78 |
| 2,335,920 | A * | 12/1943 | Dix | E04F 10/02 403/274 |
| 2,487,607 | A * | 11/1949 | Sonntag | F24C 15/20 126/299 D |
| 2,503,136 | A * | 4/1950 | Simpson | E04F 10/08 52/77 |
| 2,565,545 | A * | 8/1951 | Card | E04F 10/08 160/58.1 |
| 2,584,609 | A * | 2/1952 | Owen | E04F 10/08 52/78 |
| 2,602,200 | A * | 7/1952 | Alcorn | E04F 10/08 52/74 |
| 2,615,213 | A * | 10/1952 | Haslop | E04F 10/08 52/74 |
| 2,618,030 | A * | 11/1952 | Childers | E04F 10/08 52/76 |
| 2,626,435 | A * | 1/1953 | Speck | E04F 10/08 52/74 |
| 2,629,904 | A * | 2/1953 | Bristow | E04F 10/08 52/77 |
| 2,644,990 | A * | 7/1953 | Smith | E04F 10/08 52/77 |
| 2,714,233 | A * | 8/1955 | De Martin | E04F 10/08 52/77 |
| 2,736,932 | A * | 3/1956 | Ray | E04F 10/08 52/78 |
| 2,736,933 | A * | 3/1956 | Olsen | E04F 10/08 52/74 |
| 2,743,489 | A * | 5/1956 | Ferguson | E04F 10/08 52/78 |
| 2,788,550 | A * | 4/1957 | Andrews | E04F 10/08 52/77 |
| 2,791,010 | A * | 5/1957 | Schurger | E04F 10/08 52/78 |
| 2,848,763 | A * | 8/1958 | Schurger | E04F 10/08 52/520 |
| 3,003,550 | A * | 10/1961 | Bottom | E04F 10/08 160/62 |
| 3,092,171 | A * | 6/1963 | Deddo | E04F 10/08 160/40 |
| 3,178,777 | A * | 4/1965 | Nadel | E04D 13/158 52/73 |
| 3,216,538 | A * | 11/1965 | Miller | E04F 10/08 52/781 |
| 3,228,152 | A * | 1/1966 | Wilbourn | E04F 10/08 52/78 |
| 3,289,351 | A * | 12/1966 | Ford | E04F 10/08 49/208 |
| 3,360,886 | A * | 1/1968 | Deddo | E04F 10/005 49/71 |
| 3,943,672 | A * | 3/1976 | O'Sheeran | E04B 1/28 52/73 |
| 4,422,491 | A * | 12/1983 | Cusick, III | E04F 10/04 160/58.1 |
| 4,665,671 | A * | 5/1987 | Sarvis | E04H 15/58 160/395 |
| 4,768,317 | A * | 9/1988 | Markham | E04F 10/02 52/74 |
| 4,799,342 | A * | 1/1989 | Klevnjans | B65G 69/008 52/173.2 |
| 4,888,921 | A * | 12/1989 | Markham | E04H 15/58 52/63 |
| 5,224,307 | A * | 7/1993 | Lukos | F16B 7/0446 52/86 |
| 5,577,830 | A * | 11/1996 | Barry | E04F 10/00 362/152 |
| 6,044,593 | A * | 4/2000 | Puls | E04F 10/005 52/643 |
| 6,889,474 | B2 * | 5/2005 | Wesdock | E04F 10/005 52/204.53 |
| 7,861,990 | B2 * | 1/2011 | Barnes | F21V 33/006 248/273 |
| 8,104,527 | B1 * | 1/2012 | Konda | E04F 10/005 160/83.1 |
| 8,458,964 | B2 * | 6/2013 | Lamotte | F24S 25/61 52/74 |
| 9,551,154 | B1 * | 1/2017 | Fouratt | E04F 10/00 |
| 9,903,530 | B1 * | 2/2018 | Martz | F16M 13/005 |
| 9,957,719 | B2 * | 5/2018 | Wiborg | E04F 10/08 |
| 10,414,250 | B2 * | 9/2019 | Seeling | B60J 3/002 |
| 10,731,353 | B1 * | 8/2020 | Lewis | E04F 10/02 |
| 10,760,280 | B2 * | 9/2020 | Pan | E04C 3/04 |
| 10,858,819 | B2 * | 12/2020 | Styrc | E04B 1/1912 |
| 2005/0160683 | A1 * | 7/2005 | Eldeen | E04B 1/003 52/73 |
| 2007/0289240 | A1 * | 12/2007 | Viviano | E04F 10/005 52/446 |
| 2010/0307695 | A1 * | 12/2010 | Naylor | E04F 10/04 160/59 |
| 2011/0185643 | A1 * | 8/2011 | Dueker | E04F 10/005 52/74 |
| 2014/0262059 | A1 * | 9/2014 | Gelsebach | E04F 10/08 160/22 |

* cited by examiner

AWNING ASSEMBLY

BACKGROUND OF THE INVENTION

Recreational vehicles such as campers, motor homes, mobile homes, and so forth are well known for their usefulness during vacations, or simply as homes or temporary homes. Oftentimes, once the vehicle arrives at its destination, it is exposed to the sun unless parked in the shade. To alleviate the natural rise in temperature within the vehicle, many of the recreational vehicles may be equipped with an air conditioning system, which necessarily increases the cost of operating the vehicle. Yet further, vehicles containing windows are typically also equipped with blinds or shades to prevent the sun from radiating through the window and heating the inside of the vehicle. Of course, this also necessitates that the window be closed if the blinds or shades are being used, not only to prevent the sun from radiating into the window, but also to prevent the loss of air-conditioned air from within the vehicle. One disadvantage is that the sealed vehicle cannot benefit from fresh air that would normally be conducted into the vehicle through an open window.

To alleviate this problem, retractable awnings have been provided that shade the exterior of the recreational vehicle when natural shade such as trees are simply not available. Retractable awnings are certainly effective to provide a desired shade, however, they must be retracted before the vehicle can be moved. Otherwise, the retractable awning will likely be damaged as the vehicle is again moved. Further, retractable awnings may be damaged in relatively higher winds if deployed. The unexpected onset of a thunderstorm, for example, may result in surprisingly strong winds that damage the awning. Yet further, retractable awnings are relatively expensive and therefore increase the overall operating cost of the vehicle. Because of the cost, many recreational vehicles simply do not contain a retractable awning. An alternative solution would be a long-needed improvement in the art.

SUMMARY OF THE INVENTION

The above-referenced concerns are resolved by an awning assembly for a recreational vehicle such as a camper, motor home, or mobile home. In accordance with the present invention, a lightweight removably fixed awning assembly contains a frame having a first end and a second end, wherein the frame contains a first cross-member and a second cross member, each cross member extending from the first end to the second end. The frame further contains a first support member for supporting the frame against the recreational vehicle at the first end, wherein the first cross-member and the second cross-member are spaced apart from each other and are fixed to the first support member at the first end. The frame yet further contains a second support member for supporting the frame at the second end against the recreational vehicle at the second end, wherein the first cross-member and the second cross-member are spaced apart and fixed to the second support member at the second end.

A cover extends across and is fixed to the frame to provide a shade over an associated opening of the recreational vehicle when the awning is fixed against the recreational vehicle over an opening such as a window or door. To that end, a first attachment member is affixed or applied to a first attachment edge of the first support member. In the same way, a second attachment member is affixed or applied to a second attachment edge of the second support member, wherein said first and second edges are thereby adapted to affix over said associated opening. As an example, an adhesive tape may be applied to the first and second attachment edges for ready adherence to the recreational vehicle.

| Reference Number Index | |
|---|---|
| Awning assembly | 10 |
| Frame | 12 |
| First cross-member or beam | 14 |
| Second cross-member | 16 |
| First support member | 18 |
| Second support member | 20 |
| First plurality of edges | 22 |
| Second plurality of edges | 24 |
| First edge or arm | 26 |
| Second edge or arm | 28 |
| Third edge or arm | 30 |
| Fourth edge or arm | 32 |
| Fifth edge or arm | 34 |
| Sixth edge or arm | 36 |
| First end | 38 |
| Second end | 40 |
| Third end | 42 |
| Fourth end | 44 |
| Endcap | 46 |
| Reinforcing member | 48 |
| Fastener | 50 |
| Cavity | 52 |
| Snap assembly | 54 |
| Male snap portion | 56 |
| Female snap portion | 58 |
| Awning cover | 60 |
| Cover periphery | 62 |
| Veneer or Laminate | 63 |
| First slot or groove | 64 |
| First extrusion | 66 |
| Second slot or groove | 68 |
| Second extrusion | 70 |
| First opening or perforation | 72 |
| Second opening or perforation | 74 |
| Attachment member | 76 |
| Recreational vehicle | 78 |
| Opening or window | 80 |
| First Velcro ® strip | 82 |
| Second Velcro ® strip | 84 |
| Third Velcro ® strip | 86 |
| Fourth Velcro ® strip | 88 |
| Captured nut or female insert | 90 |
| First side of the opening | 92 |
| Second side of the opening | 94 |

DETAILED DESCRIPTION OF THE INVENTION

Figure 1:
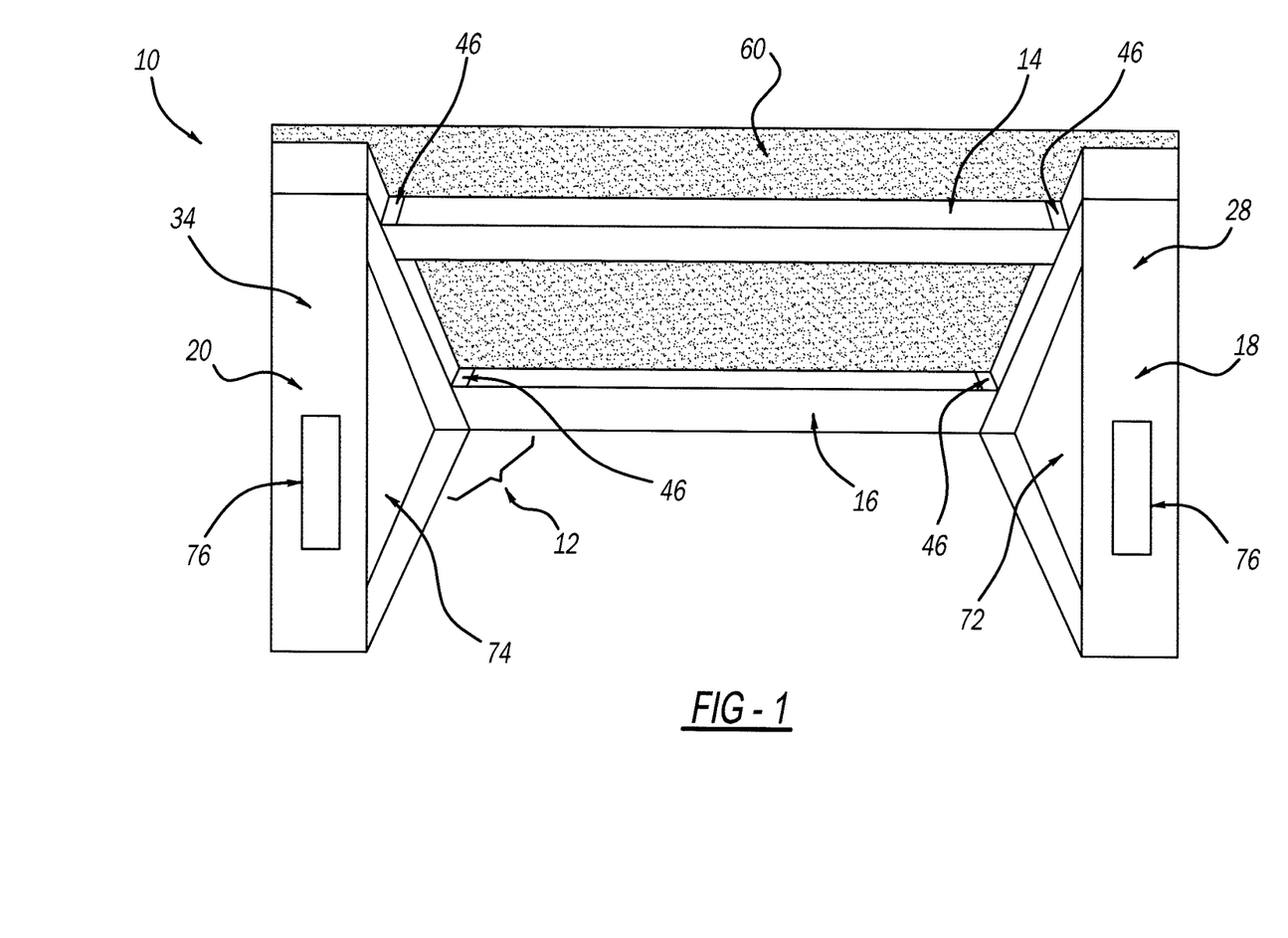
FIG. 1 illustrates an exemplary awning assembly, in accordance with the present invention.

In accordance with the present invention, and with reference to FIG. 1, an awning assembly 10 is formed from a frame 12 containing a first cross-member or beam 14 and a second cross-member or beam 16. In an exemplary assembled embodiment, a first support member 18 and a second support member 20 supports the first cross-member 14 which is preferably in substantially parallel orientation to the second cross-member 16. Referring to FIGS. 1-4, a first plurality of edges 22 defines a first periphery of the first support member 18, for construction and application of the awning assembly 10. A second plurality of edges 24 defines a second periphery of the second support member 20, for construction and application of the awning assembly 10.

As shown in FIG. 1 for example, the first cross member or beam 14 extends across the length of an upper portion of the frame 12 and is attached to the first support member 18 and the second support member 20. As also shown in the FIGURES, the first exemplary support member 18 may be triangular in shape (but is not thereby limited), and contains a first arm or edge 26, a second arm or edge 28, and a third arm or edge 30. In the same way, the second exemplary support member 20 is also triangular in shape (but is not thereby limited), and contains a fourth arm or edge 32, a fifth arm or edge 34, and a third arm or edge 36.

In yet another aspect of a preferred embodiment of the invention, and as shown in FIG. 1, the first arm or edge 26 and the fourth arm or edge 32 may extend from the top to the bottom of the awning assembly 10. The bottom edges 28 and 34 respectively extend to the inner side of the first and fourth edges 26 and 32, that when taken together provide a flush bottom surface of the support members 18 and 20. It has been found that full extension of the first and fourth edges or arms 26 and 32 provide for a stronger awning assembly.

As also shown in FIG. 1 and other figures, a first end 38 of the first cross-member 14 is fixed to the first edge 26 of the first support member 18. A second end 40 of the first cross-member 14 is fixed to the fourth edge 32 of the second support member 20, that taken together with first support member 18 thereby supports the cross-member 14 across the length of the awning 10. A third end 42 of the second cross-member 16 is fixed to the first edge 26 of the first support member 18, spaced apart from the first end 38 of the first cross-member 14. A fourth end 44 of the second cross-member 16 is fixed to the fourth edge 32 of the second support member 20, space apart from the second end 40, that taken together with first support member 18 supports the second cross-member 16 across the length of the awning 10, wherein first cross-member 14 and second cross-member 16 are preferably substantially parallel to each other.

It will be appreciated that the cross-members and the support members may be made of a light-weight material for ease of attaching to an associated vehicle. For example, each piece may be made of Styrofoam®, polystyrene, expanded polystyrene, cellulose, cedar, cedar shake, vinyl shake, or some other lightweight or lightweight foam material. Some or all of these may, if desired, be coated with polyurethane for added integrity of the structure or piece. Yet further, if desired, the lightweight or foam cross-members and support members may be covered with a wood grain veneer or laminate 63, for added structural integrity and for aesthetic purposes as well. In general, a preferred embodiment of the present invention is a lightweight adhesively applied awning assembly 10. Stated another way, a preferred embodiment of the present invention is a lightweight removably fixed awning assembly 10, removably fixed by adhesive or Velcro® means, for example.

Figure 3:
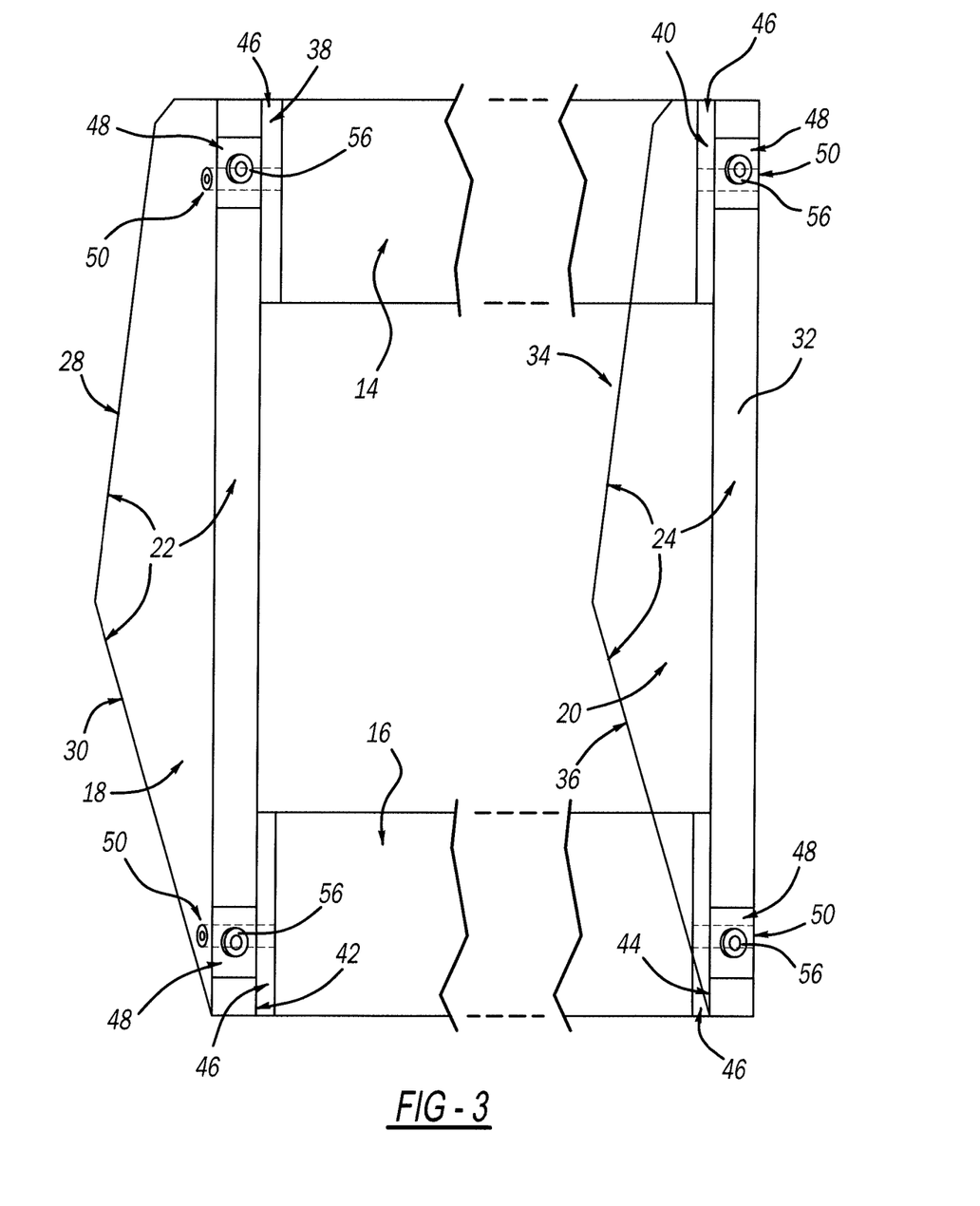
FIG. 3 illustrates a solid first and second support member in accordance with the present invention.
Figure 4:
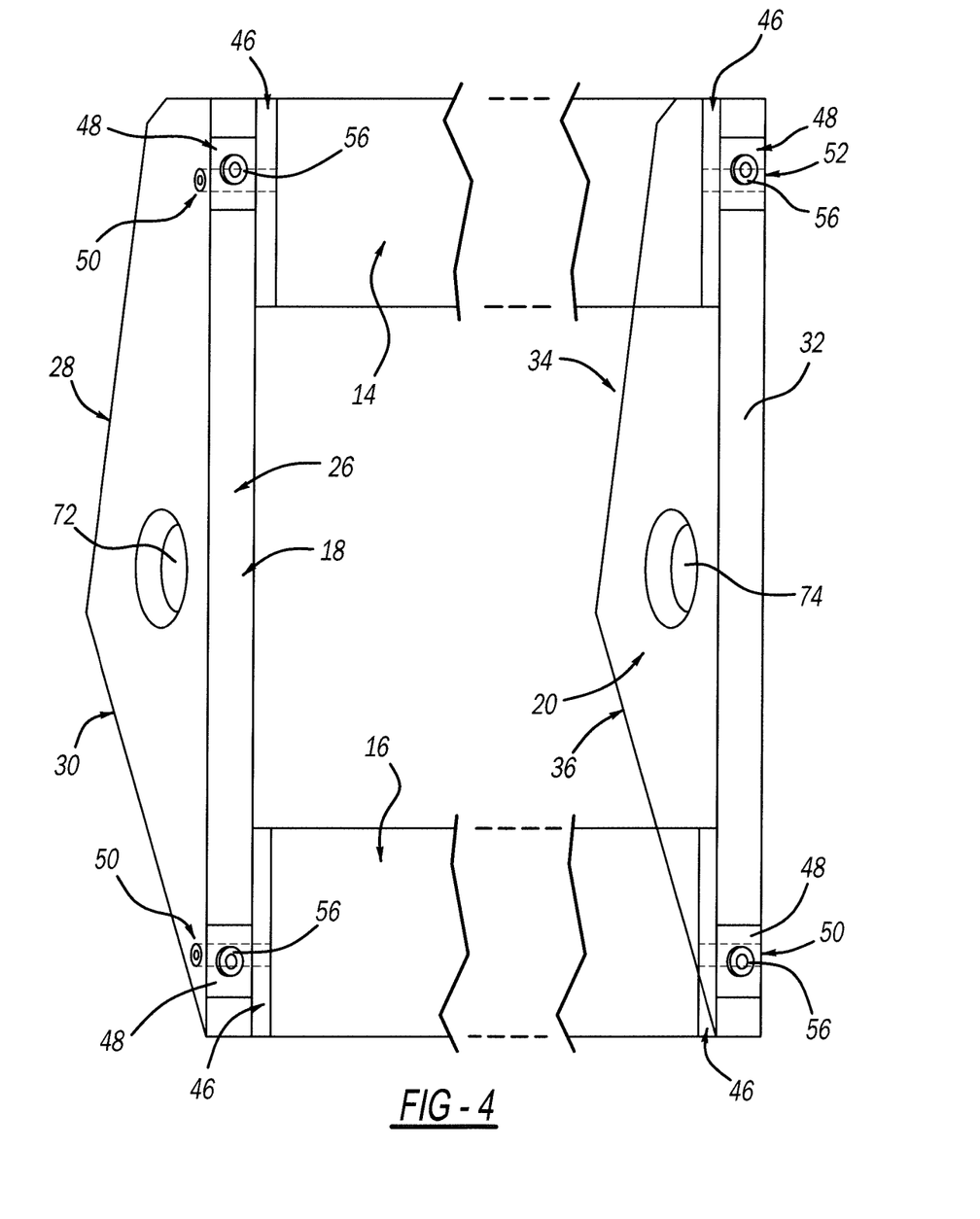
FIG. 4 illustrates a perforated first and second support member in accordance with the present invention.
Figure 6:
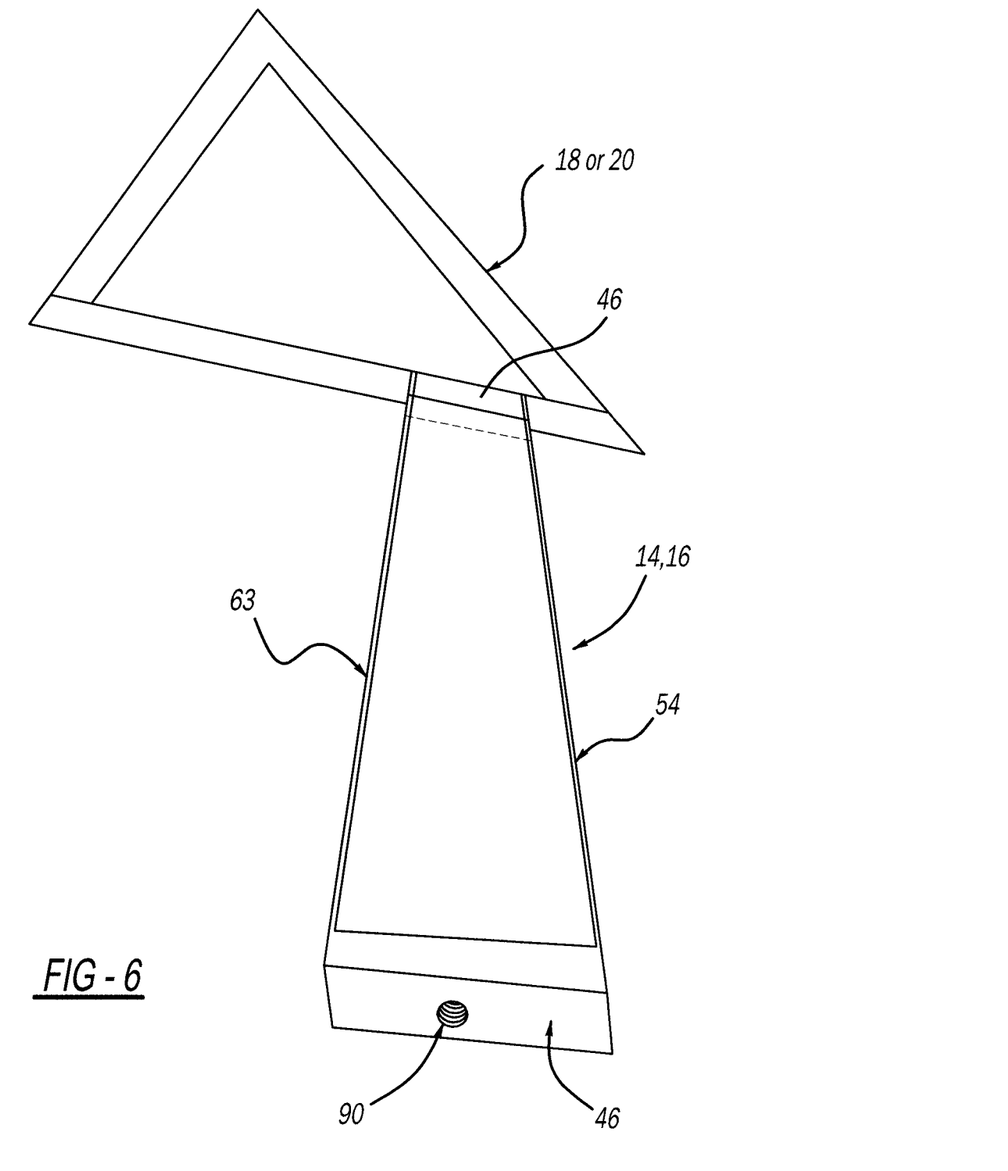
FIG. 6 illustrates a partially assembled exemplary awning assembly.

As shown in FIG. 6 and other figures, an endcap 46 may be fixed to each end 38, 40, 42, and 44 of the cross-members, to facilitate the improved use of a lightweight material as described above. Each endcap 46 is made of a reinforced material having a cross-section substantially equal to the cross-section of the cross-member 14, 16, and may be made of a relatively tough material such as pine, cedar, wood, or durable plastic, and may be glued or otherwise fixed to each end. As further shown in FIG. 6 and other figures, a captured nut or threaded female insert 90 may be inserted within each endcap 46 for fixing the respective support member arm thereto. As shown in FIGS. 3 and 4, for example, a screw and washer functions as a fastener 50, and when screwed through each support member, fastens the respective support member 18, 20 to the respective end of the respective cross-member 14, 16.

Figure 2:
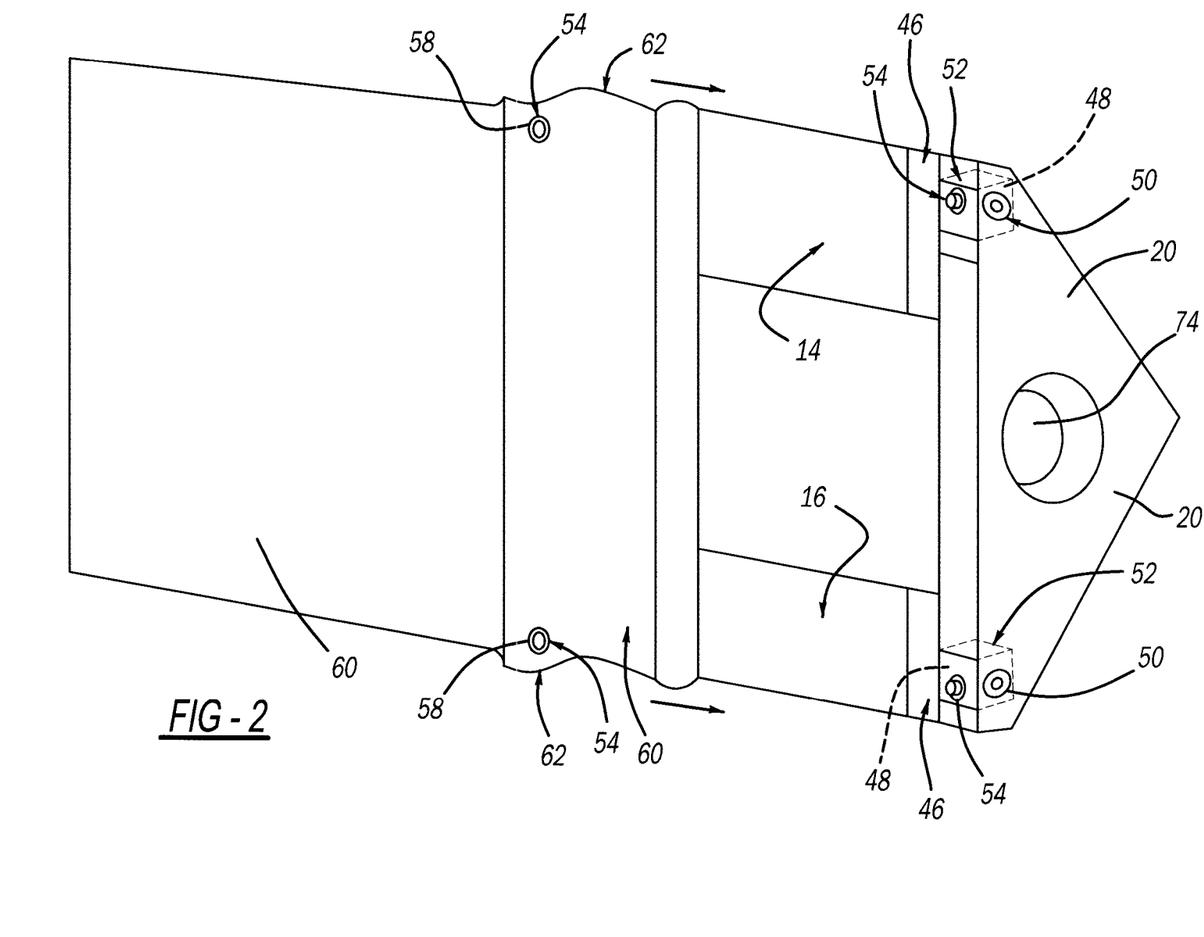
FIG. 2 illustrates an exemplary awning assembly with the awning assembly partially covered.

As further shown in FIGS. 2-4, it will be further appreciated that a reinforcing member 48, made in the same way as the endcaps 46, may be glued within a support member 18, 20. A cavity 52 is created in the support member by removing a portion of foam or lightweight material from the support member and inserting/fixing a similarly-sized reinforcing member 48 within the support member. As also shown in FIGS. 2-4 for example, the fastener 50 may penetrate the reinforcing member 48 and then protrude into the endcap 46 for securement of the support member to the respective end of the respective cross-member. As further described below, and as also shown in FIGS. 2-4 for example, male portions 56 of a snap assembly 54 may also be fixed or attached to reinforcing members 48, for snapping a female portion 58 of the snap assembly 54 thereto.

As also shown in FIGS. 1 and 2, an awning cover 60 is fixed over the frame 12 thereby providing a shield from the sun, and to a more limited degree, a shield from rain. As indicated above, the awning cover 60 may be fastened to the frame through a plurality of snap assemblies 54 or fastening systems. A periphery 62 of the awning cover 60 may contain a plurality of female portions 58 spaced about the periphery 62. The awning cover 60 may be a tarp or flexible cloth with a snap assembly 54, as shown in FIGS. 1 and 2, for example. Other types of materials may form the cover 60, such as a Styrofoam® or polystyrene shown in FIGS. 7 and 8, which in that case also functions as at least one cross-member 14 and/or 16. This is further elaborated on below.

As explained above, male snap portions 56 may be similarly spaced on an outer edge of each cross member 14 and 16, and if desired also on the outer upper edge of each support member 18 and 20. As shown in FIG. 2 for example, when a plurality of female portions 56 of the frame 12 are snapped into a corresponding number of female portions on the cover 60, the awning cover 60 is thereby secured to the frame 12. Other fastening systems 62 for securing the awning cover 60 to the frame 12 may be employed as desired, such as a Velcro® arrangement for example.

In yet another aspect of the cover 60, the cover 60 may be designed to extend above the frame 12 by about one to two inches, to thereby form a flange against the recreational vehicle exterior once the awning assembly 10 is affixed to the recreational vehicle. In this way, rainwater streaming from the top to the bottom of the recreational vehicle is at least partially sealed from the interior of the awning assembly 10. In the same way, the cover 60 may also extend from the bottom of the frame 12 about one half to one inch to ensure that water is drained away from the frame 12.

Figure 7:
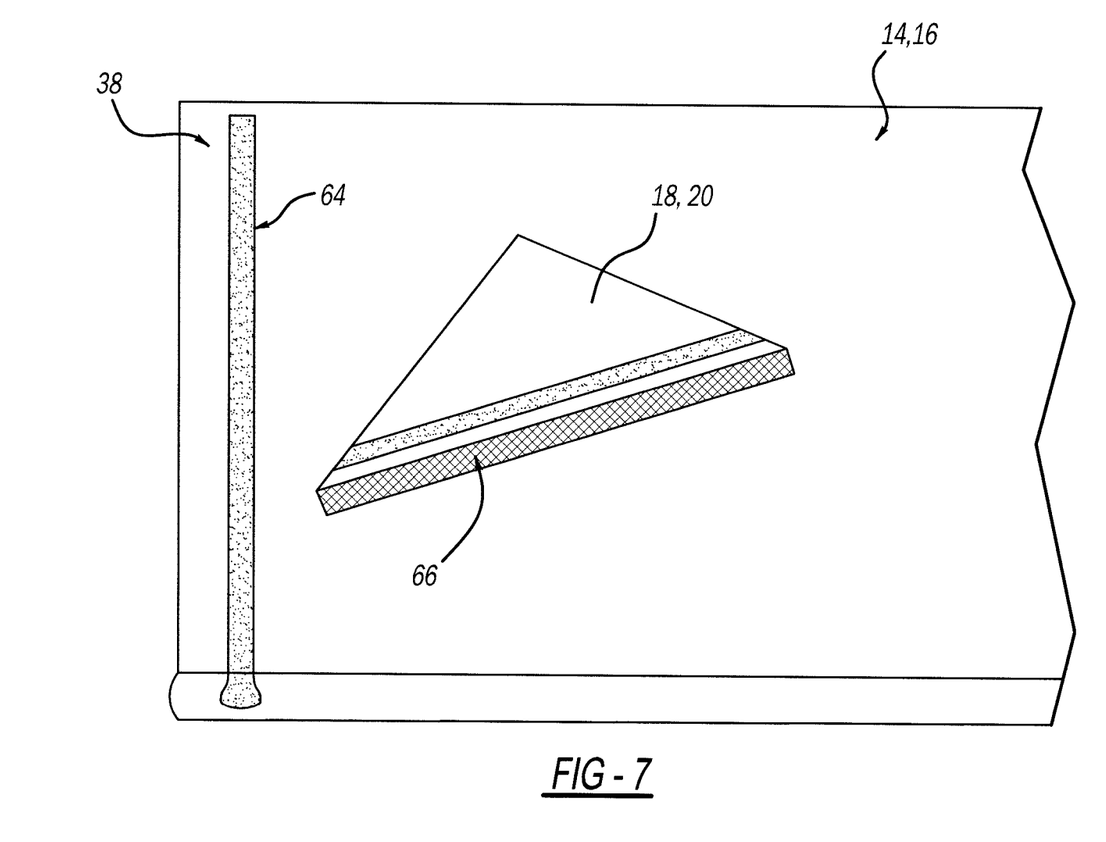
FIG. 7 illustrates yet another partially assembled exemplary awning assembly.
Figure 8:
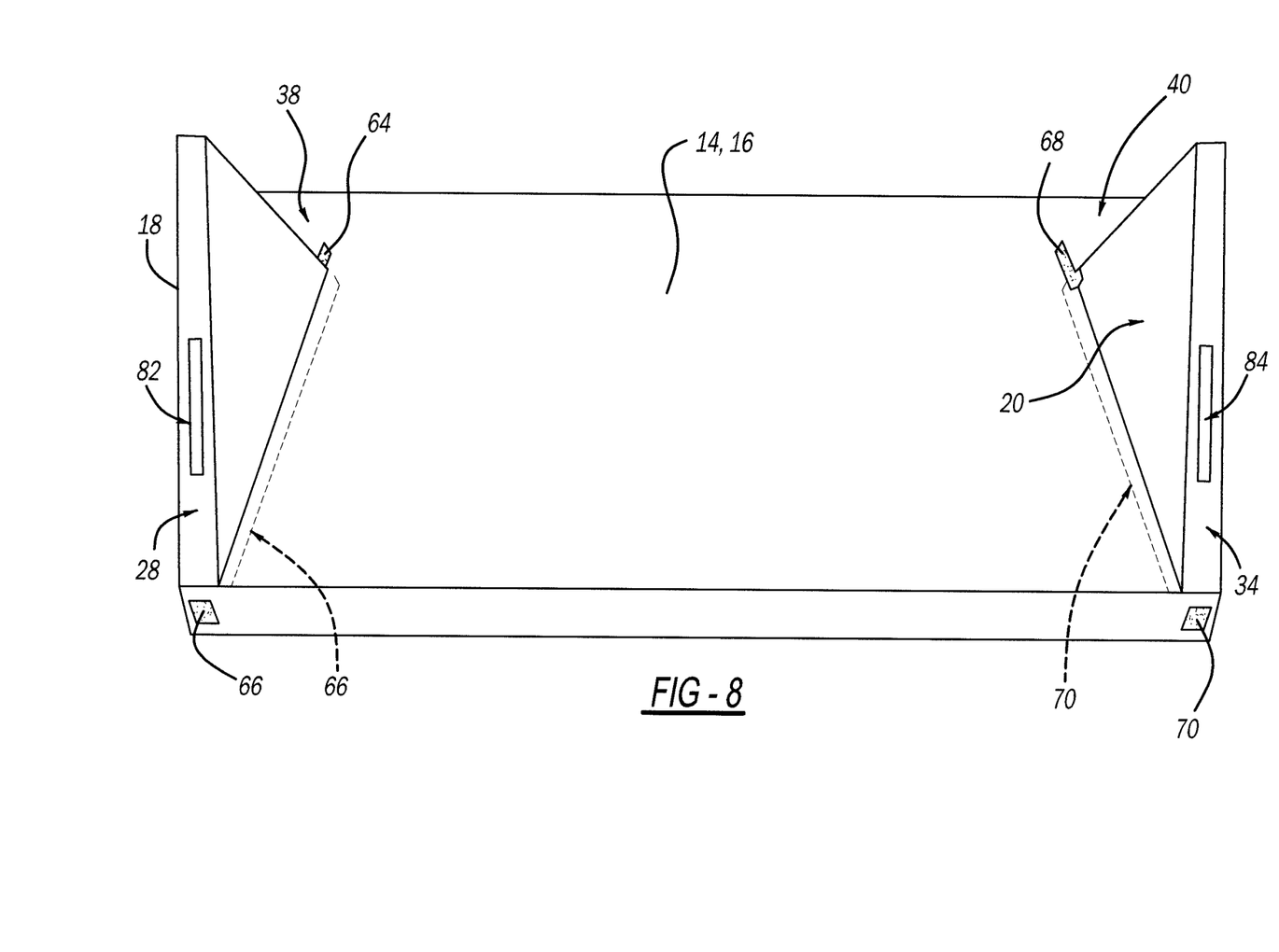
FIG. 8 illustrates yet another exemplary awning assembly, in accordance with the present invention.

In yet another embodiment shown in FIGS. 7 and 8, the awning assembly 10 may contain at least one cross-member 14 and/or 16 fixed to respective support members 18 and 20. It will be further appreciated that the at least one cross-member 14 and/or 16 may be fixed to and span across the edges 26 and 32 to function not only as a cross-member, but also as a cover 60. A first slot or groove 64 spans across at least a portion of the width of the cross-member 14 and/or 16 at a first end 38 of the cross member 14 and/or 16. A first complementary extrusion 66 is formed on an edge of the first support member 18, for sliding the extrusion 66 within the slot or groove 64 and thereby fixing the first support member 18 to the at least one cross-member 14 and/or 16. In the same way, a second slot or groove 68 is formed on and spans across at least a portion of the width of the cross-member 14 and/or 16 at a second end 40 of the cross-member 14 and/or 16. A second complementary extrusion 70 is formed on an edge of the second support member 20, for sliding the extrusion 70 within the second slot or groove 68 and thereby fixing the second support member 20 to the at least one cross-member 14 and/or 16.

In yet another aspect of the invention, and as shown in FIGS. 1, 2, and 4, a first opening, orifice, or perforation 72 may be formed within the first support member 18 to permit wind to pass through the support member and thereby reduce the force of a wind, for example, on the area of the support member. A second opening, orifice, or perforation 74 may be formed within the second support member 20 to permit wind to pass through the support member and thereby reduce the force of a wind, for example, on the area of the support member. Alternatively, it may be desired to provide a solid imperforated support member 18 and 20 as shown in FIG. 3.

Figure 5:
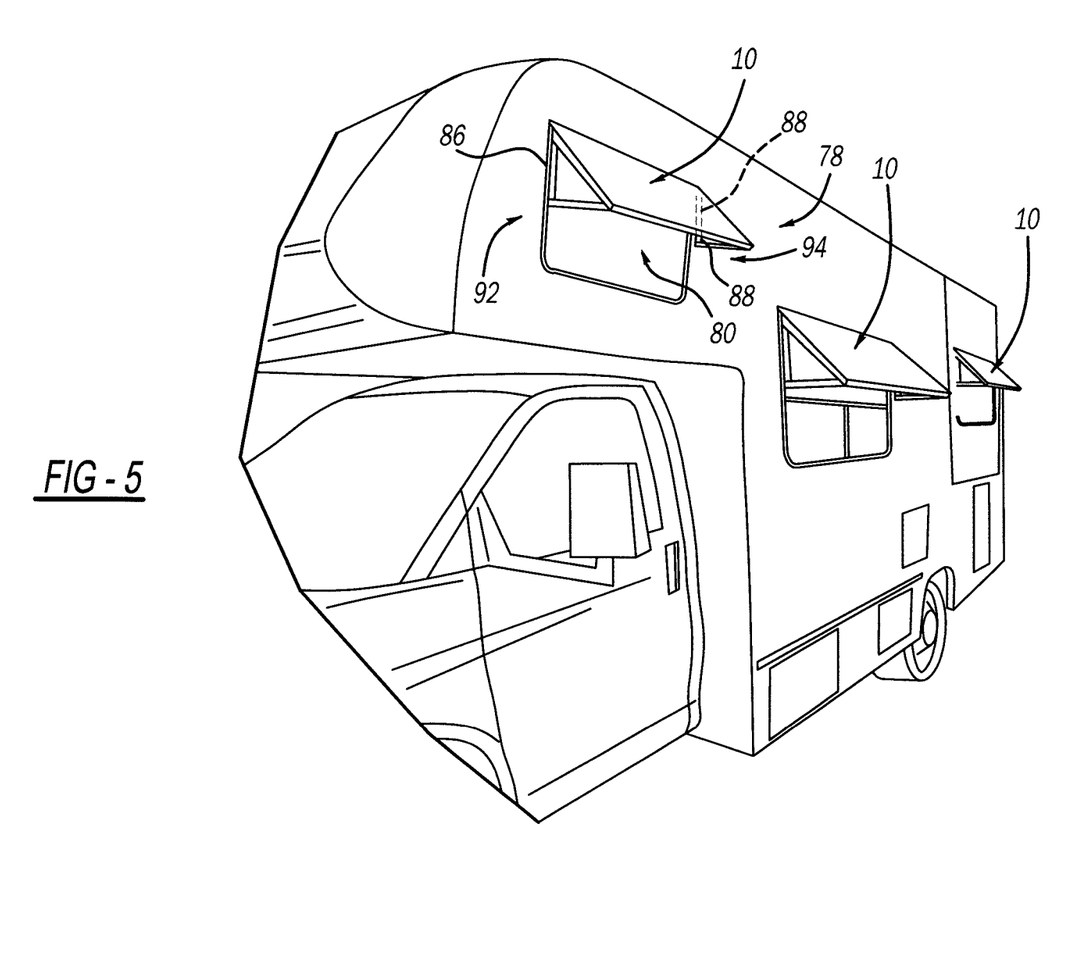
FIG. 5 illustrates an exemplary awning assembly removably fixed to a recreational vehicle, in accordance with the present invention.

In yet another aspect of the invention, and as exemplified in FIGS. 1 and 5, an attachment member 76 may be applied to the back edges 28 and 34 of the first and second support members 18 and 20, respectively. The attachment member may be a Command® adhesive strip provided by 3M® or, alternatively, the attachment member may be a Velcro® strip, whereby the attachment member 76 attached to the edges 28 and 34 removably fixes the awning assembly 10 to an associated recreational vehicle 78 over an opening or window 80. When using Velcro® strips, it will be appreciated that the attachment member 76 will comprise a first Velcro® strip 82 fixed to the edge 28, a second Velcro® strip 84 fixed to the edge 34, a third Velcro® strip 86 fixed about a first side 92 of the opening 80 for mating with the first Velcro® strip 82, and a fourth Velcro® strip 88 fixed about a second side 94 of the opening 80 for mating with the second Velcro® strip 84. Yet further, if desired, a fifth Velcro® or adhesive attachment member may be provided in a median portion of the upper cross-member 14 that interfaces with the recreational vehicle once the awning assembly 10 is removably fixed thereto. See FIGS. 1 and 5. It will be appreciated that in accordance with the present invention, any suitable type of attachment member 76 may be employed.

With further reference to FIG. 5, it will be appreciated that the awning assembly 10 may be designed to extend from one quarter of the distance of the opening 80 from a top of the window 80 to a bottom of the window 80, to completely over the opening 80. However, it is generally preferred to have the awning assembly 10 extend about halfway from the top of the window to the bottom of the window. For example, if the window has a height of 16 inches, then the effective height of the awning assembly would be about eight inches. Other preferred and exemplary awning assembly/window height ratios in inches might be as follows: 12/24, 18/36, or 24/48. It will further be appreciated that it is believed that the use of an awning assembly on both sides of the recreational vehicle would not only provide a desired shade, but would also create a pleasant cross-draft within the recreational vehicle.

The embodiments provided herein are meant to exemplify but not limit the embodiments that may be provided in accordance with the present invention. Therefore, the various features of the present invention are meant to include any and all equivalents made in accordance with the present invention, and should only be limited as provided in the appended claims.

What is claimed is:

1. An awning assembly comprising:
   a frame having a first end and a second end, said frame comprising a first cross-member and a second cross member, each cross member extending from the first end to the second end, and each cross member containing at least one reinforced end;
   a first support member for supporting said frame at the first end, wherein the first cross-member and the second cross-member are spaced apart from each other and are fixed to the first support member at the first end;
   a second support member for supporting said frame at the second end, wherein the first cross-member and the second cross-member are spaced apart and fixed to the second support member at the second end;
   a cover extending across and fixed to the frame to provide shade over an associated opening of an associated structure; and
   a removably affixed first attachment member applied to a first edge of the first support member and a removably affixed second attachment member applied to a second edge of the second support member, wherein said first and second edges are thereby adapted to be removably affixed about said associated opening to said associated structure, and, said first and second cross-members are adapted to be spaced apart from said associated opening.

2. The awning assembly of claim 1 wherein said first support member is perforated to allow wind to pass therethrough.

3. The awning assembly of claim 2 wherein said second support member is perforated to allow wind to pass therethrough.

4. The awning assembly of claim 1 wherein said removably affixed first attachment member comprises a first removably affixed adhesive strip applied to said first edge and, said removably affixed second attachment member comprises a second removably affixed adhesive strip applied to said second edge.

5. The awning assembly of claim 1 wherein said first attachment member comprises a first connective member applied to said first edge and, said second attachment member comprises a second connective member applied to said second edge, for mating with a third connective member and a fourth connective member located about said opening, respectively.

6. The awning assembly of claim 1 wherein said first and second support members each contain a first support opening and a second support opening, respectively.

7. The awning assembly of claim 1 wherein said first and second support members are solid panels.

8. The awning assembly of claim 1 wherein said cover contains a plurality of female snaps that correspond with and are fixed to an equal number of male snaps fixed to said cross members and said support members.

9. The awning assembly of claim 1 wherein said first and second cross members, and, said first and second support members are formed from plastic.

10. The awning assembly of claim 9 wherein said plastic is injection molded.

11. The awning assembly of claim 1 wherein said first and second cross members, and, said first and second support members are formed from wood.

12. The awning assembly of claim 11 wherein said wood contains a laminated surface covered with a laminate.

13. An awning assembly comprising:
    a frame having a first end and a second end, said frame comprising at least one cross-member, said at least one cross member extending from the first end to the second end;
    a first support member for supporting said frame at the first end, wherein the at least one cross-member is fixed to the first support member at the first end;
    a second support member for supporting said frame at the first end, wherein the at least one cross-member is fixed to the second support member at the second end;
    a cover extending across and fixed to the frame to provide shade over an associated opening of an associated structure; and
    a removably affixed first attachment member applied to a first edge of the first support member and a removably affixed second attachment member applied to a second edge of the second support member, wherein said first and second edges are thereby adapted to be removably affixed about said associated opening to said associated structure.

14. The awning assembly of claim 13 further comprising a first cross-member and a second cross-member, wherein the first cross-member and the second cross-member are spaced apart and fixed to the first support member at the first end, and, are fixed to the second support member at the second end.

15. The awning assembly of claim 13 wherein the first support member comprises a first extrusion, the second support member comprises a second extrusion, and the at least one cross-member comprises a first slot along the first end and a second slot along the second end, whereby the first extrusion is slidably engaged within said first slot to fix the first support member to the at least one cross-member, and, the second extrusion is slidably engaged within the second slot to fix the second support member to the at least one cross-member.

16. The awning assembly of claim 13 wherein the cover and the at least one cross-member are the same structural element.

17. The awning assembly of claim 13 wherein at least one of the cover, the at least one cross-member, or the first and second support members contain a laminate over peripheral edges of the respective member or cover.

18. The awning assembly of claim 13 wherein at least one of the cover, the at least one cross-member, or the first and second support members contain a polyurethane coating.

19. The awning assembly of claim 13 wherein one or more of the at least one cross-member, the cover, or the first and second support members are painted.

20. The awning assembly of claim 13 wherein the cover is made from one or more of polystyrene, Styrofoam®, cedar, pine, cedar shake, or flexible tarp material.

21. An awning assembly comprising:
    a frame having a first end and a second end, said frame comprising at least one first cross-member, said at least one first cross-member extending from the first end to the second end, said at least one first cross-member containing a cross-member first end and a cross-member second end;
    a first end cap fixed at said cross-member first end, and, a second end cap fixed at said cross-member second end, for strengthening said cross-member first and second ends;
    a first support member for supporting said frame at the first end, wherein the at least one cross-member is fixed to the first support member at the first end cap of the cross-member first end;
    a second support member for supporting said frame at the second end, wherein the at least one cross-member is fixed to the second support member at the second end cap of the cross-member second end;
    a cover extending across and fixed to the frame to provide shade over an associated opening of an associated structure; and
    a first attachment member applied to a first edge of the first support member and a second attachment member applied to a second edge of the second support member, wherein said first and second edges are thereby adapted to be affixed about said associated opening to said associated structure.

22. The awning assembly of claim 21 further comprising:
    a second cross-member extending from the first end to the second end, said second cross-member containing a cross-member third end and a cross-member fourth end and said second cross-member spaced apart from said at least one first cross-member;
    a third end cap fixed at said cross-member third end, and, a fourth end cap fixed at said cross-member fourth end, for strengthening said cross-member third and fourth ends;
    wherein the second cross-member is fixed to the first support member at the third end cap of the cross-member third end, and
    wherein the second cross-member is fixed to the second support member at the fourth end cap of the cross-member fourth end.

23. The awning assembly of claim 22 further comprising:
    a first reinforcing member contained within the first support member, for attachment to said first end cap; and
    a second reinforcing member contained within the second support member, for attachment to said second end cap.

24. The awning assembly of claim 23 further comprising:
    a third reinforcing member contained within the first support member, for attachment to said third end cap; and
    a fourth reinforcing member contained within the second support member, for attachment to said fourth end cap.

25. The awning assembly of claim 21 wherein the first and second attachment members are removably affixed to the first and second edges, respectively, and, said awning assembly is thereby adapted to be removably affixed over said associated opening.

* * * * *